C. BEARENS.
TRANSMISSION GEAR.
APPLICATION FILED JAN. 4, 1921.
1,398,763.
Patented Nov. 29, 1921.
3 SHEETS—SHEET 1.
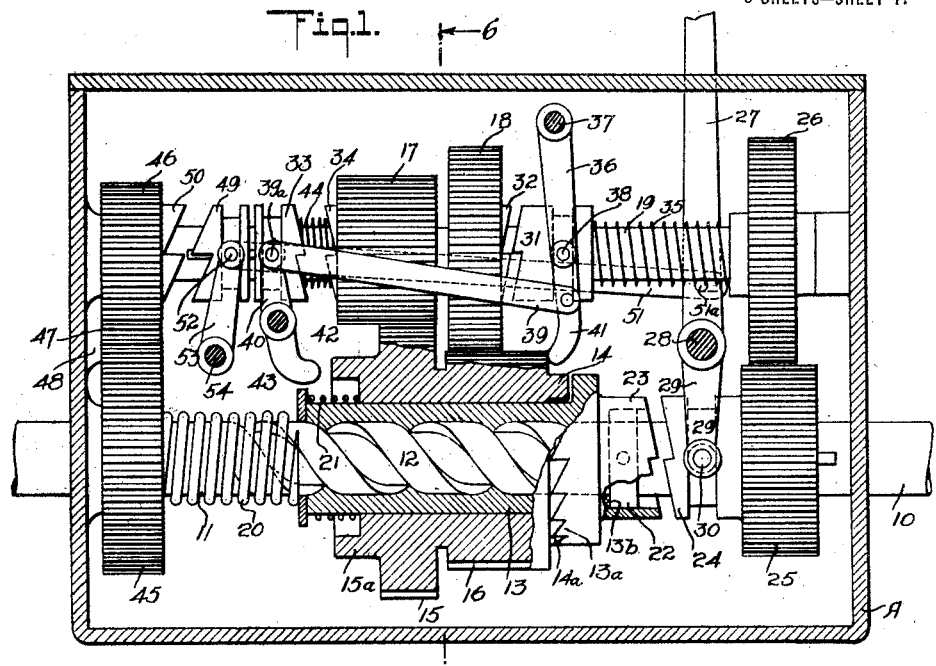
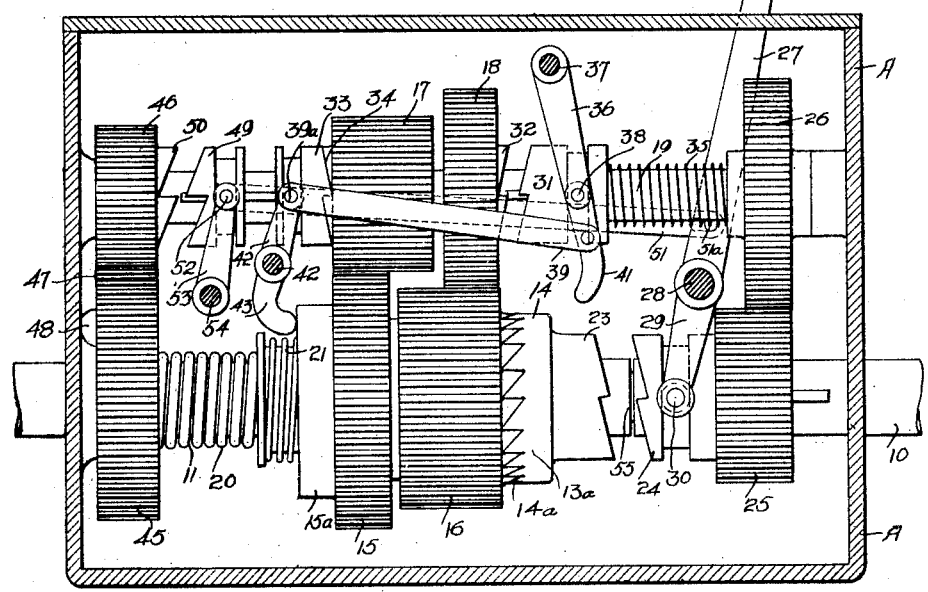
WITNESSES
INVENTOR
CLAUDE BEARENS
BY
ATTORNEYS

C. BEARENS.
TRANSMISSION GEAR.
APPLICATION FILED JAN. 4, 1921.

1,398,763.

Patented Nov. 29, 1921.

WITNESSES
Frederick Diehl.

INVENTOR
CLAUDE BEARENS
BY
ATTORNEYS

C. BEARENS.
TRANSMISSION GEAR.
APPLICATION FILED JAN. 4, 1921.

1,398,763.

Patented Nov. 29, 1921.
3 SHEETS—SHEET 3.

WITNESSES

INVENTOR
CLAUDE BEARENS
BY
ATTORNEYS

UNITED STATES PATENT OFFICE.

CLAUDE BEARENS, OF NEW YORK, N. Y.

TRANSMISSION-GEAR.

1,398,763.	Specification of Letters Patent.	Patented Nov. 29, 1921.

Application filed January 4, 1921. Serial No. 434,890.

*To all whom it may concern:*

Be it known that I, CLAUDE BEARENS, a citizen of the United States, and a resident of the city of New York, borough of Manhattan, in the county and State of New York, have invented a new and Improved Transmission-Gear, of which the following is a description.

My invention relates to a transmission gear embodying means whereby to effect an automatic gear shift so that in overcoming inertia in starting or in overcoming resistance as in hill climbing, or otherwise running under a heavy load, under direct drive and high speed, should the speed be too high for starting or overcoming resistance without shock, the gearing will be automatically thrown out of high gear and into a lower gear.

The present invention which is intended as an improvement on the transmission gear shown in an application filed by me May 8, 1920, Serial Number 329,848, has more particularly for an object to provide for automatically throwing the gearing successively into an intermediate speed and low speed to overcome the load.

More specifically the invention has for an object to provide an improved assemblage including a novel automatic shift gear unit and the controlling means therefor, as well as to provide a simplified assemblage.

A further object of the invention is to provide an automatic gearing of the indicated type that may be optionally changed to high gear from a lower gear.

Reference is to be had to the accompany drawings forming a part of this specification, it being understood that the drawings are merely illustrative of one example of the invention.

Figure 1 is a partly sectional elevation of a transmission gear embodying my invention, showing the gear in neutral position;

Fig. 2 is an elevation with the elements in low gear;

Figure 3:
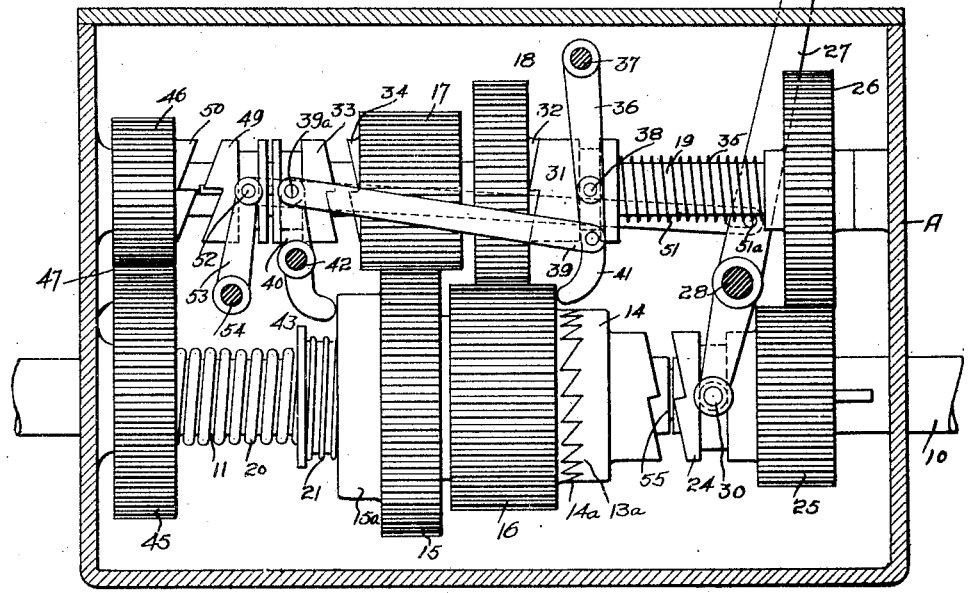
Fig. 3 is a view similar to Fig. 2, with the elements in intermediate gear.

In the illustrated example of my invention the numeral 10 indicates a drive shaft, and 11, a driven shaft, the same having suitable bearings in a casing A. The driven shaft 11 at the end adjacent to the drive shaft 10 is formed with a spiral 12, fitted on which is a sleeve 13 conforming internally to said spiral, and loose on said sleeve is a shift gear unit designated generally by the character 14 and comprising a gear 15 and a smaller gear 16, respectively, for low drive and intermediate drive. Ordinarily, the shift unit 14 is held to the sleeve 13 so that one will partake of the movements of the other, the engagement being effected through the various adjustments for direct high speed, intermediate drive, low gear, or reverse. In the form shown the sleeve 13 at the end has a clutch 13$^a$ to engage an opposed clutch 14$^a$ on sleeve 14. Constantly meshing respectively with the gear elements 15, 16, are gear elements 17, 18, loose on a counter-shaft 19. A strong spiral spring 20 is coiled about the driven shaft 11 normally tending to maintain the direct driving connection between the shaft 10, 11, as will appear and a light spring 21 is coiled about the sleeve 13 tending to maintain the clutch elements 13$^a$, 14$^a$, in engagement. Said clutch elements 13$^a$, 14$^a$, will be hereinafter further referred to. To limit the movement of the sleeve 13 longitudinally of the driven shaft 11 and spiral 12, suitable stop means is provided, there being shown a collar 22 (Fig. 1) on shaft 11 at the end, against which a shoulder 13$^b$ on sleeve 13 may engage. The opposed ends of the driven shaft 11 and drive shaft 10 have mating clutch elements 23, 24 and the spring 20 tends to maintain the clutch elements in engagement.

Slidable on but turnable with the drive shaft 10 is a gear element 25 with which clutch 24 is rigid. Said gear 25 meshes constantly with a gear element 26 fast on the counter-shaft 19. A clutch lever 27 fulcrumed as at 28 has a shift fork 29 provided with the usual rollers 30 to lie in the annular groove of clutch element 24 as usual for shifting the said clutch element into or out of engagement with the clutch element 23. On the counter-shaft 19 is a sliding clutch element 31 adapted to engage a clutch element 32 rigid with the gear element 18 on said countershaft. Also, on shaft 19 is a shifting clutch element 33 adapted to engage clutch element 34 rigid with the gear element 17. A spring 35 is coiled about the shaft 19 and normally tends to maintain the clutch element 31 in engagement with clutch element 32 for turning the gear element 18, said spring 35 being of strength inferior to that of the spring 20.

Automatic shift means is provided for the clutch elements 31, 33 controlled by the longitudinal movements of the shift gear unit 14 for which purpose use is made of a lever 36 fulcrumed at its upper end as at 37 and having rollers 38 lying in the usual groove of clutch element 31. A link 39 is pivoted at one end to lever 36 and at its opposite end is pivotally connected as at 39ª to a rocker arm 40 on a transverse rod or shaft 42, there being rockable with said arm 40 a clutch fork 40ª having rollers 40ᵇ lying in the channel of clutch element 33. Depending from the clutch fork 40ª is an arm 43 deflected laterally at its lower end toward the shift unit 14 to lie adjacent one end thereof. Similarly, adjacent to the opposite end of the shift unit 14 is a depending arm 41 of the lever 36. A spring 44 is coiled about the shaft 19 between the clutch elements 33, 34 tending to separate the same but yielding to a movement of the element 33 under a pull of the link 39.

Factoring in the reverse means is a gear element 45 fast on driven shaft 11 and on the counter-shaft 19 is a gear wheel 46, there being an intermediate gear element 47 mounted on a stud shaft 48 meshing with both of said elements, 45, 46.

Figure 6:
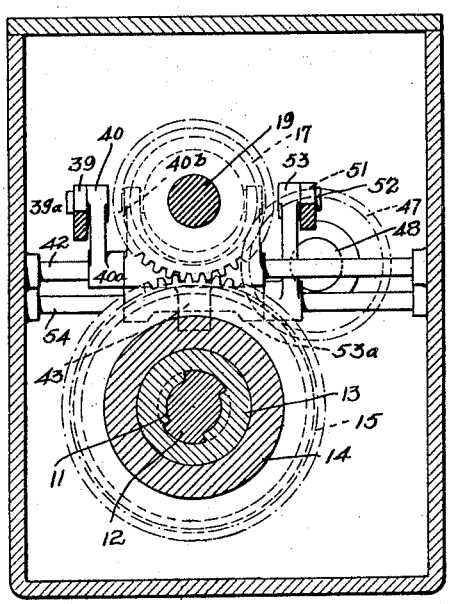
Fig. 6 is a cross section on the line 6—6, Fig. 1.

The numeral 50 indicates a clutch element rigid with the gear element 46, there being a mating clutch element 49 slidable on shaft 19. A link 51 is pivoted at one end to the lever 27 as at 51ª and at its opposite end said link is pivoted as at 52 to a rocker arm 53 on a transverse rod or shaft 54, there being rigid with said arm 53 to rock therewith a clutch fork 53ª (Fig. 6) for engaging the clutch element 49 for sliding the same.

With the described construction, the gearing being in the neutral position of Fig. 1 and the drive shaft 10 being driven, the gear elements 25, 26, shaft 19, and elements 18 and 17 and the shift unit 14 will turn idly.

Figure 4:
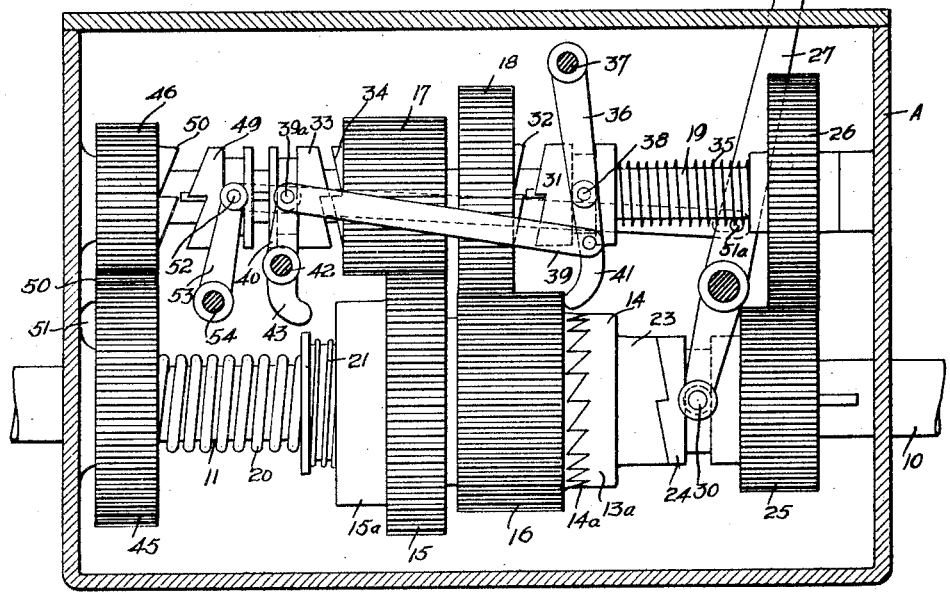
Fig. 4 is a view similar to Figs. 2 and 3, with the elements in direct drive high gear position.

If the lever 27 be thrown to the position of Fig. 4, the gearing will establish a direct high speed drive because the clutch element 24 will have been moved into clutching engagement with clutch element 23 on the driven shaft 11. If the resistance cannot be overcome by the direct high speed drive, the force exerted on the clutch element 33 will cause said clutch element 23 and the sleeve 13 to turn relatively to the spiral rib 12 and move axially on the driven shaft 11 against the pressure of the spring 20, said spring yielding until the clutch elements 23, 24 are disengaged, as in Fig. 3. At the same time, the shift unit 14 will be moved longitudinally with the sleeve 13 and said unit 14 will thereby move away from the arm 41 on lever 36 permitting the spring 35 to move the clutch 31 into engagement with clutch element 32 of gear element 18. The drive will now be from the shaft 10 and gear element 25 to element 26 and shaft 19, thereby turning the gear element 18 which in turn will drive the unit 14, sleeve 13, and shaft 11, it being understood that the clutch elements 13ª, 14ª are constantly engaged except as hereinafter mentioned.

If the resistance of the load on the driven shaft 11 is still not overcome by the intermediate drive, the unit 14 and sleeve 13 will continue to turn relatively to the driven shaft 11 and its spiral 12 causing a further longitudinal movement of said unit and sleeve until the unit 14 engages the arm 43, said arm being about to be engaged in position of said intermediate gear as in Fig. 3. With the continued longitudinal movement of the unit 14, its engagement with the arm 43 will rock said arm and the clutch fork 40, thereby moving the clutch element 33 into engagement with clutch element 34, on the gear element 17. At the same time the rocking of the arm 40, will, through the link 39, have moved the clutch lever 36 and clutch element 31 against the action of the spring 35 until said clutch element 31 is disengaged from clutch element 32. With the clutch 33 in engagement and the clutch 31 out of engagement as shown in Fig. 2, the drive will now be from shaft 10 and element 25 to element 26 and shaft 19, thereby turning the clutched gear element 17 and turning the unit 14 through its gear element 15.

If it is desired to manually throw the gearing to direct high speed from the intermediate or low speed drive, the clutch pedal of the automobile may be depressed, the drive shaft section 10 will be no longer driven and thereby the unit 14 and the spring 20 having been relieved of resistance, said spring can react to engage the clutch elements 23, 24.

Figure 5:
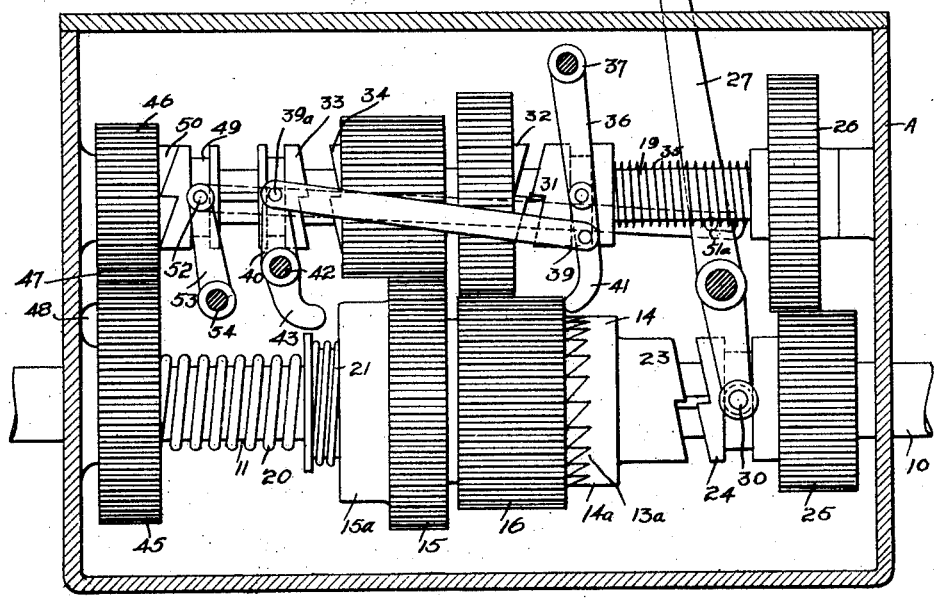
Fig. 5 is a view similar to Figs. 2 and 4, showing the gear in position for reverse drive.

For reversing, the lever 27 is thrown to the position of Fig. 5, thereby disengaging the clutch elements 23, 24 and at the same time through the link 51 engaging the clutch elements 49 and 50, so that the drive will now be from shaft 10 and gear element 25 through gear element 26 and shaft 19 to the gear element 46 and through the intermediate element 47 to the element 45 fast on the driven shaft 11.

The numeral 55, Figs. 2 and 3, indicates an alining sleeve section extending into the opposed ends of the drive shaft 10 and the driven shaft 11 as referred to in my aforenamed application.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims. For example, it will be readily apparent that the gear elements 15, 16, 17 and 18 may have the teeth thereof either square, as shown, or oblique, both forms of teeth being common in automobile gearing.

Having thus described my invention, I claim:

1. A transmission gear including a drive shaft, a driven shaft, a shift gear assemblage adapted for direct engagement with the drive shaft for high speed drive, and yieldable to undue load resistance to disengage itself from the drive shaft, intermediate and low speed gear elements, adapted respectively to drive said shift assemblage, clutches to selectively bring into action said intermediate or low speed gear elements, and means responsive to a varying degree of shifting movement of said assemblage to successively bring into action the intermediate and low gear drive elements.

2. A transmission gear including a drive shaft, a driven shaft, and a gearing adapted to function for different speeds of the driven shaft, said gearing including a shift gearing assemblage comprising a sleeve on the driven shaft and adapted for shifting movement thereon in a spiral path, clutch means manually operable to engage said sleeve with the drive shaft, the sleeve being yieldable to undue load resistance to disengage itself from the drive shaft, a gear element on said sleeve and factoring in the different speed drives, said gear element being responsive to the spiral shifting movement of the sleeve, and means to automatically bring into action a lower speed drive for said gear element with the said shifting thereof.

3. A transmission gear including a drive shaft, a driven shaft, and gearing adapted to factor for different speeds from the driven shaft, said gearing including a shift gear assemblage comprising a sleeve on the driven shaft, manually operable means to throw said sleeve into driving connection with the drive shaft, a shift gear element on said sleeve, said sleeve being yieldable to undue load resistance to disengage itself from the drive shaft, mating clutch elements on the sleeve and gear element, means normally tending to hold said clutch elements in engagement, and means to actuate said gear element at a decreased speed upon disengagement of the sleeve from the drive shaft.

4. A transmission gear including a drive shaft, a driven shaft, a shift gear assemblage having gear elements for intermediate drive and low speed drive, means to establish direct drive connection between the drive shaft and said assemblage, said assemblage being yieldable to undue load resistance to disestablish said drive connection, a countershaft driven from the drive shaft, gear wheels loose on the counter-shaft and meshing respectively with the gear elements of the shift gear assemblage, and means to automatically throw successively into action said intermediate and low speed gear wheels according to the degree of movement of said assemblage.

5. A transmission gear including a drive shaft, a shift gear unit having gear elements for intermediate drive and low speed drive, means to establish direct connection between the drive shaft and said unit, said unit being yieldable to undue load resistance to disestablish said drive connection, a counter-shaft driven from the drive shaft, gear wheels loose on the counter-shaft and meshing respectively with the gear elements on the shift gear unit, there being clutch elements on said gear wheels, the clutch on the one wheel being at the opposite side thereof from the clutch on the other wheel, shiftable clutch elements to engage respectively with the clutch elements on said gear wheels, a connection between said slidable clutch elements, and means to simultaneously move the connected sliding clutch elements in opposite directions with corresponding movements of the shift gear unit.

6. A transmission gear including a drive shaft, a driven shaft, an interposed gear adapted to function for different speeds of the driven shaft, said gearing including a shift gear assemblage factoring in the several speed drives and yieldable to undue load resistance to shift from high speed direct drive successively to intermediate and low gear positions; together with manually operable means to establish a drive connection between said assemblage and the drive shaft for direct high speed drive, a reversing gear, and clutch means to throw said reversing gear into or out of action, said clutch means being controllable by said manually operable means.

CLAUDE BEARENS.